US012391786B2

(12) United States Patent
Kumar et al.

(10) Patent No.: US 12,391,786 B2
(45) Date of Patent: Aug. 19, 2025

(54) ANTIOXIDANT FOR LOW-DENSITY POLYURETHANE FOAM

(71) Applicant: SHELL OIL COMPANY, Houston, TX (US)

(72) Inventors: Arvind Kumar, Bangalore North (IN); Pranaya Man Singh Pradhan, Bangalore North (IN)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 16/769,562

(22) PCT Filed: Dec. 6, 2018

(86) PCT No.: PCT/EP2018/083777
§ 371 (c)(1),
(2) Date: Jun. 3, 2020

(87) PCT Pub. No.: WO2019/110726
PCT Pub. Date: Jun. 13, 2019

(65) Prior Publication Data
US 2020/0339727 A1 Oct. 29, 2020

(30) Foreign Application Priority Data
Dec. 8, 2017 (IN) .............................. 201741044114

(51) Int. Cl.
C08G 18/08 (2006.01)
C08G 18/16 (2006.01)
C08G 18/18 (2006.01)
C08G 18/24 (2006.01)
C08G 18/48 (2006.01)
C08G 18/76 (2006.01)
C08K 5/00 (2006.01)
C08K 5/134 (2006.01)
C08L 71/02 (2006.01)
C08L 75/08 (2006.01)

(52) U.S. Cl.
CPC ......... C08G 18/14 (2013.01); C08G 18/4833 (2013.01); C08G 18/7621 (2013.01); C08K 5/005 (2013.01); C08K 5/1345 (2013.01); C08G 2110/0008 (2021.01); C08G 2110/005 (2021.01); C08G 2110/0083 (2021.01)

(58) Field of Classification Search
CPC ... C08G 18/48; C08G 2110/005; C08J 9/0023
See application file for complete search history.

(56) References Cited

U.S. PATENT DOCUMENTS

| 3,751,375 A | 8/1973 | Bender et al. | |
| 4,139,503 A * | 2/1979 | Kollmeier | C08G 18/6666 |
| | | | 521/174 |
| 4,178,420 A | 12/1979 | Reale | |
| 5,011,908 A * | 4/1991 | Hager | C08G 18/638 |
| | | | 521/174 |
| 5,182,310 A | 1/1993 | Skorpenske et al. | |
| 5,373,028 A | 12/1994 | McAfee et al. | |
| 5,869,565 A | 2/1999 | Clauss | |
| 5,962,120 A | 10/1999 | Keipert | |
| 6,348,514 B1 | 2/2002 | Calabrese et al. | |
| 6,884,825 B2 | 4/2005 | Daunch et al. | |
| 2002/0123536 A1 | 9/2002 | Kinoshita et al. | |
| 2004/0143028 A1 | 7/2004 | Takano et al. | |
| 2006/0079590 A1 | 4/2006 | Nagazumi et al. | |
| 2006/0293402 A1 | 12/2006 | Nagazumi et al. | |
| 2009/0270523 A1 * | 10/2009 | Dai | C08G 18/4072 |
| | | | 521/137 |
| 2011/0230581 A1 | 9/2011 | Klescewski et al. | |
| 2012/0202908 A1 | 8/2012 | Sasaki et al. | |
| 2012/0238657 A1 | 9/2012 | Powell, Jr. et al. | |
| 2012/0264839 A1 | 10/2012 | Powell, Jr. et al. | |
| 2013/0030068 A1 | 1/2013 | Sasaki et al. | |
| 2013/0203880 A1 | 8/2013 | George et al. | |
| 2014/0155506 A1 | 6/2014 | Maruoka et al. | |
| 2014/0275310 A1 | 9/2014 | Adkins et al. | |
| 2017/0044341 A1 | 2/2017 | Klesczewski et al. | |
| 2017/0267914 A1 | 9/2017 | Crom et al. | |
| 2021/0292467 A1 | 9/2021 | Lindner | |

FOREIGN PATENT DOCUMENTS

| CN | 103275296 A | 9/2013 |
| CN | 104774306 A | 7/2015 |

(Continued)

OTHER PUBLICATIONS

Office Action Received for Russian Application No. 2020117720, Mailed on Jun. 15, 2022, 15 Pages(6 Pages of English Translation and 9 Pages of Official Copy).
Notice of Opposition Received for European Application No. 18819035.9, Mailed on Mar. 29, 2022, 32 Pages (32 Pages of Official Copy).
Dertel et al., "5 Polyurethane Flexible Foams", 5.1 Slabstock Foams, Polyurethane Handbook, 2nd Edition, 1994, ISBN 1-56990-157-0, pp. 177-215.
Invoice for the purchase of 22.880,000 kg of Lupranol®4003, Sep. 3, 2015, 1 Page.
Technical Data sheet for Lupranol® 4003, May 2015, 3 Pages.
Production procedure of Lupranol® 4003, May 6, 2013, 3 Pages.
Technical Data sheet for Irganox®245, Published in Sep. 2010, 2 Pages.
Stohler, "New Aspects in Polyol Stabilization and Scorch Prevention in Flexible Polyurethane Foams", Macromolecules 1992, first published in1993, pp. 527-539, ISBN 90-6764-155-3.

(Continued)

Primary Examiner — Melissa A Rioja
(74) Attorney, Agent, or Firm — SHELL USA, INC.

(57) ABSTRACT

The invention relates to a process for preparing a polyurethane foam comprising reacting a polyether polyol and a polyisocyanate in the presence of a blowing agent and an antioxidant, wherein: the antioxidant consists of one or two or more phenolic antioxidants, wherein the one or more phenolic antioxidants contain no atoms other than carbon, hydrogen and oxygen, and the amount of the one or more phenolic antioxidants is of from 2,300 to less than 10,000 parts per million by weight (ppmw) based on the polyether polyol; the isocyanate index is higher than 100; the maximum temperature during the preparation of the polyurethane foam is higher than 140° C.; and the density of the polyurethane foam is lower than 25 kg/m³.

12 Claims, No Drawings

(56) References Cited

FOREIGN PATENT DOCUMENTS

| | | | |
|---|---|---|---|
| CN | 106117537 | A | 11/2016 |
| EP | 0076491 | A2 | 4/1983 |
| EP | 0343907 | A2 | 11/1989 |
| EP | 0495551 | A2 | 7/1992 |
| EP | 1437372 | A1 | 7/2004 |
| EP | 1630185 | A1 | 3/2006 |
| JP | 2006063344 | A * | 3/2006 |
| JP | 2013227490 | A | 11/2013 |
| KR | 20120015529 | A | 2/2012 |
| KR | 20120060672 | A | 6/2012 |
| RU | 2144546 | C1 | 1/2000 |
| WO | 2006111492 | A2 | 10/2006 |
| WO | 2011125952 | A1 | 10/2011 |
| WO | 2015162125 | A1 | 10/2015 |
| WO | 2017037204 | A1 | 3/2017 |
| WO | 2017162520 | A1 | 9/2017 |

OTHER PUBLICATIONS

Office Action Received for Korean Application No. 20207015892, Mailed on May 8, 2024, 14 pages (08 Pages of English Translation and 06 Pages of Official Copy).

International Search Report and Written Opinion received for PCT Patent Application No. PCT/EP2018/083777, mailed on Mar. 22, 2019, 12 pages.

Clauss et al., "Antioxidant Systems for Stabilization of Flexible Polyurethane Slabstock Foams", Journal of Cellular Plast, vol. 33, Issue No. 5, Jan. 1, 1997, pp. 457-476, XP009008914.

Statton et al., "Evaluation of Hindered Phenols for Minimization of Foam Discoloration Using the Microwave Scorch Test", Journal of Cellular Plastics, Sep.-Oct. 1984, pp. 346-350.

Gray et al., "Low Volatility Antioxidants for Scorch Protection of Polyurethane Foams", Journal of Vinyl & Additive Technology, vol. 2, Issue No. 3, Sep. 1996, pp. 265-269.

Ionescu, " Chemistry and Technology of Polyols for Polyurethanes", Rapra Technology Limited, 2005, pp. 134-137.

Gray et al., "New Scorch Inhibitors for Flexible Polyurethane Bunstock", 35th Annual Polyurethane Technical/Marketing Conference, Oct. 9-12, 1994, pp. 333-337.

Vasile et al., "Handbook of Polyolefins", Second Edition, Chapter 20: Additives for Polyolefins, pp. 517 to 522, Year: 2020.

Ionescu, "Chemistry and Technology of Polyols for Polyurethanes", Rapra Technology Limited, 2005, p. 8.

* cited by examiner

ANTIOXIDANT FOR LOW-DENSITY POLYURETHANE FOAM

CROSS REFERENCE TO RELATED APPLICATIONS

This is a national stage application of International application No. PCT/EP2018/083777, filed 6 Dec. 2018, which claims priority of Indian Application No. 201741044114, filed 8 Dec. 2017.

FIELD OF THE INVENTION

The present invention relates to a process for preparing a polyurethane foam, to a polyurethane foam obtainable by said process, to a shaped article comprising said polyurethane foam, and to a polyether polyol composition that may be used in said process.

BACKGROUND OF THE INVENTION

Polyurethane foams, such as flexible polyurethane foams, have found extensive use in a multitude of industrial and consumer applications. Flexible polyurethane foams are widely used in numerous applications. Main sectors of application are automotive and aircraft industry, upholstered furniture and technical articles. For instance, full foam seats, top pads for the seats and restraints for back and head, all made from flexible polyurethane foam, are widely used in cars and aeroplanes. Other applications include the use of flexible polyurethane foam as carpet backings, bedding and mattresses, textile lamination, packaging, foamed seat saddles for motorbikes, gaskets between a car body and its lights, lip seals of air filters for engines and insulating layers on car parts and engine parts to reduce sound and vibration.

Polyurethane foams are made by reacting a polyether polyol and a polyisocyanate in the presence of a blowing agent. It is known to add an antioxidant to the polyether polyol prior to reacting it with a polyisocyanate. Adding an antioxidant increases the storage stability of the polyether polyol. Polyether polyols are prone to oxidation and an antioxidant prevents or inhibits such oxidation.

The use of antioxidants in relation to polyether polyols and polyurethane foams is well known and has been disclosed in many publications. Reference is made to the following publications:

1) US20110230581; US2006293402; US20170267914; WO2006111492; US4178420; US5869565; WO201737204; WO2017162520; CN106117537; US2013030068; CN103275296; JP2013227490; US2014155506; US2012264839; US2012238657; US2013203880; KR20120060672; WO2011125952; US2004143028; US2002123536; U.S. Pat. No. 5,182,310;
2) M. Clauss et al., "Antioxidant Systems for Stabilization of Flexible Polyurethane Slabstock Foams", Journal of Cellular Plastics, Volume 33, September/October 1997, pages 457-476;
3) G. L. Statton et al., "Evaluation of hindered phenols for minimization of foam discoloration using the microwave scorch test", Journal of Cellular Plastics, September-October 1984, pages 346-350;
4) R. L. Gray et al., "Low Volatility Antioxidants for Scorch Protection of Polyurethane Foams", Journal of Vinyl & Additive Technology, Vol. 2, No. 3, September 1996, pages 265-269;
5) M. Ionescu, "Chemistry and Technology of Polyols for Polyurethanes", Rapra Technology Limited, 2005, pages 134-137;
6) R. L. Gray et al., "New Scorch Inhibitors for Flexible Polyurethane Bunstock", 35th Annual Polyurethane Technical/Marketing Conference, Oct. 9-12, 1994, pages 333-337.

In addition to increasing the storage stability of polyether polyols (at room temperature), antioxidants may also increase the scorch resistance during the preparation of polyurethane foams.

By "scorch" reference is made to an oxidative degradation process induced by a high temperature. Since the reaction of a polyether polyol with a polyisocyanate is exothermic, heat is released resulting in a temperature increase in the (developing) foam. The temperature is highest in the core of the foam. Such high temperature may result in an increased formation of free radicals (oxidation). These free radicals in turn may react with the polymers making up the polyurethane foam. This may also result in an undesired discoloration of the foam, especially in the core of the foam. Therefore, antioxidants have traditionally been added to react with said free radicals and thereby increase the scorch resistance during the preparation of polyurethane foams.

Further, over the years, water has become an important blowing agent in making polyurethane foams. Water is a so-called chemical blowing agent. Water reacts with isocyanate groups of the polyisocyanate, thereby releasing carbon dioxide which causes the blowing to occur. As this reaction is also exothermic, the temperature during the preparation of a polyurethane foam is even further increased. This in turn results in a further increased risk of scorch during the preparation of a polyurethane foam.

Still further, when it is desired to make low-density polyurethane foams using a chemical blowing agent (such as water), a relatively large amount of the blowing agent needs to be used. Such increased amount of a chemical blowing agent further contributes to a higher temperature and accordingly to an increased risk of scorch during the preparation of a polyurethane foam. A similar effect is achieved by increasing the isocyanate index.

To increase both the storage stability of polyether polyols and the scorch resistance during the preparation of polyurethane foams, various antioxidant systems have been developed in the past. Such antioxidant systems generally comprise 2 or more different antioxidants, at least one of which is a phenolic antioxidant, such as a sterically hindered phenolic antioxidant. The other antioxidant or at least one of the other antioxidants is a non-phenolic antioxidant, such as an aminic antioxidant. For example, at page 134 of the above-mentioned reference by M. Ionescu, a synergism between two or three antioxidants is noted, such as: a) hindered phenols—alkylated diphenylamines, b) hindered phenols—alkylated diphenylamines-phenothiazine, and c) hindered phenols—phenothiazine.

However, antioxidant systems which comprise 2 or more antioxidants one of which is a phenolic antioxidant and another is an aminic antioxidant, have several disadvantages. Firstly, aminic antioxidants effect a relatively high VOC/FOG emission from polyurethane foams which is undesired. By "VOC" reference is made to "Volatile Organic Compounds". And by "FOG" reference is made to compounds which evaporate at a slightly higher temperature than VOC compounds and which may result in a mist ("fog") build up (condensation) on displays and windows, for example inside a car. Further, aminic antioxidants may result in polyurethane foams having a relatively low UV and light resistance. Further, aminic antioxidants are known for their negative influence on the NOx resistance of polyurethane foams which contain them. Further, in case an antioxidant system comprises an aminic antioxidant, it is generally difficult to get approval from the "FDA", i.e. the United States "Food and Drug Administration", for such antioxidant system. For example, Irganox 5057 which is an aminic antioxidant, does not have such FDA approval.

Therefore, in the industry there has been a strong focus on developing aminic antioxidant free systems. Such amine-free antioxidant systems comprise generally a phenolic antioxidant and a non-phenolic/non-aminic antioxidant, e.g. one or more of phenothiazine, lactones and phosphites. However, the commercial availability of low VOC/FOG emission, amine-free antioxidant systems is limited. In addition, said amine-free antioxidant systems are relatively expensive as compared to the more commonly used antioxidant systems comprising a phenolic antioxidant and an aminic antioxidant as described above.

Therefore, it is an object of the invention to provide an antioxidant for use in the preparation of polyurethane foams, especially polyurethane foams prepared by using a chemical blowing agent (such as water), more especially low-density polyurethane foams prepared by using such chemical blowing agent, which antioxidant has a good performance in terms of polyether polyol storage stability and/or scorch resistance during the preparation of polyurethane foams.

In addition, it is an object of the invention to provide an antioxidant for the above-mentioned use, such that the resistance of the foam thus obtained against light, for example UV light, and/or the resistance of the foam against NOx may be improved. It is especially desired that discoloration of the foam due to light (e.g. UV light) and/or NOx is prevented or deferred as much as possible.

SUMMARY OF THE INVENTION

Surprisingly it was found that one or more of the above-mentioned objects may be achieved by a process for preparing a polyurethane foam having a density lower than 25 kg/m$^3$, wherein only one or more phenolic antioxidants are used as the antioxidant(s) in an amount of from 2,300 to less than 10,000 parts per million by weight (ppmw) based on the polyether polyol.

Accordingly, the present invention relates to a process for preparing a polyurethane foam comprising reacting a polyether polyol and a polyisocyanate in the presence of a blowing agent and an antioxidant, wherein:
the antioxidant consists of one phenolic antioxidant or two or more phenolic antioxidants, the one or more phenolic antioxidants contain no atoms other than carbon, hydrogen and oxygen, and the amount of the one or more phenolic antioxidants is of from 2,300 to less than 10,000 parts per million by weight (ppmw) based on the polyether polyol;
the isocyanate index is higher than 100;
the maximum temperature during the preparation of the polyurethane foam is higher than 140° C.; and
the density of the polyurethane foam is lower than 25 kg/m$^3$.

Further, the present invention relates to a polyurethane foam obtainable by the above-described process, and to a shaped article comprising said polyurethane foam.

The present invention also relates to a polyether polyol composition, comprising a polyether polyol and an antioxidant, wherein the antioxidant consists of one phenolic antioxidant or two or more phenolic antioxidants, the one or more phenolic antioxidants contain no atoms other than carbon, hydrogen and oxygen, and the amount of the one or more phenolic antioxidants is of from 2,300 to less than 10,000 parts per million by weight (ppmw) based on the polyether polyol.

DETAILED DESCRIPTION OF THE INVENTION

In the present invention, a polyether polyol and a polyisocyanate are reacted in the presence of a blowing agent and an antioxidant.

Within the present specification, by "antioxidant" reference is made to a compound that prevents or inhibits the oxidation of other compounds. Oxidation is a chemical reaction that can produce free radicals, leading to chain reactions. Antioxidants may terminate these chain reactions by reaction with the free radicals.

Preferably, the antioxidant is added to the polyether polyol and/or the polyisocyanate, preferably to the polyether polyol, prior to reacting the polyether polyol with the polyisocyanate. Alternatively, the antioxidant may be added during reacting the polyether polyol with the polyisocyanate. Further, in case the antioxidant consists of two or more phenolic antioxidants, these antioxidants may be added separately or as a blend, for example by adding to one or more than one different polyether polyol(s) which may be used in the present invention.

In the present invention, the antioxidant consists of one phenolic antioxidant or two or more phenolic antioxidants. Preferably, the antioxidant consists of one, two or three phenolic antioxidants, more preferably one or two phenolic antioxidants. Most preferably, the antioxidant consists of one phenolic antioxidant. This means that in the present invention only one or more phenolic antioxidants are used as the antioxidant(s). This implies that in the present invention, substantially no non-phenolic antioxidant is present. Within the present specification, "substantially no" means that no detectable amount of the component in question is present.

It has been found in the present invention that in the preparation of preparing a polyurethane foam having a relatively low density, i.e. lower than 25 kg/m$^3$, the one or more phenolic antioxidants may be used in an amount of from 2,300 to less than 10,000 parts per million by weight (ppmw) based on the polyether polyol, which still has a good performance in terms of polyether polyol storage stability and/or scorch resistance during the preparation of polyurethane foams. In addition, it has been found that the foam thus obtained has a good performance in terms of resistance of the foam against light, for example UV light.

Due to the above-mentioned good scorch resistance during the preparation of polyurethane foams in accordance with the present invention, the temperature that can still be tolerated during such preparation is relatively high. In the present invention, the maximum temperature during the preparation of the polyurethane foam is higher than 140° C. Furthermore, the isocyanate index may be relatively high. In the present invention, said index is higher than 100.

Yet another consequence is that, advantageously, no cooling additive needs to be added to decrease the temperature during the preparation of the polyurethane foam. Therefore, it is preferred that in the present invention, substantially no cooling additive is present. Within the present specification, by "cooling additive" reference is made to a compound that is capable of effecting heat absorption thereby reducing the temperature of the mixture wherein it is present. Further, within the present specification, the term "cooling additive"

does not include physical blowing agents. An example of a cooling additive is calcium carbonate ($CaCO_3$). Other examples of cooling additives are hydrates of inorganic compounds, such as those as disclosed in US2006293402. Thus, it is preferred that in the present invention, substantially no hydrate of an inorganic compound is present, or that substantially no inorganic compound is present.

Within the present specification, by a "phenolic antioxidant" reference is made to an antioxidant which comprises one or more benzene rings, wherein the benzene ring or at least one of the benzene rings is a benzene ring which is substituted by one or more groups, which group or at least one of which groups is a hydroxyl (—OH) group.

In the present invention, the one or more phenolic antioxidants contain no atoms other than carbon, hydrogen and oxygen.

Further, in the present invention, the amount of the one or more phenolic antioxidants is of from 2,300 to less than 10,000 parts per million by weight (ppmw), based on the polyether polyol, preferably of from 2,500 to 8,000 ppmw, more preferably of from 2,800 to 7,000 ppmw, more preferably of from 3,000 to 6,000 ppmw, more preferably of from 3,500 to 5,500 ppmw, most preferably of from 4,000 to 5,000 ppmw. In case the antioxidant consists of two or more phenolic antioxidants, the amount as defined herein refers to the total amount of these two or more phenolic antioxidants. The amount of the one or more phenolic antioxidants is at least 2,300 ppmw, preferably at least 2,500 ppmw, more preferably at least 2,800 ppmw, more preferably at least 3,000 ppmw, more preferably at least 3,300 ppmw, more preferably at least 3,500 ppmw, more preferably at least 3,700 ppmw, more preferably at least 4,000 ppmw, more preferably at least 4,200 ppmw, most preferably at least 4,300 ppmw. When using one or more phenolic antioxidants in an amount of 10,000 ppmw or higher, based on the polyether polyol, there may be an increased risk of the formation of colored bodies from the phenolic antioxidant(s) itself, which may give rise to an undesired color of the foam. In the present invention, the amount of the one or more phenolic antioxidants is less than 10,000 ppmw, preferably at most 9,000 ppmw, more preferably at most 8,000 ppmw, more preferably at most 7,000 ppmw, more preferably at most 6,000 ppmw, more preferably at most 5,500 ppmw, more preferably at most 5,300 ppmw, more preferably at most 5,000 ppmw, more preferably at most 4,800 ppmw, most preferably at most 4,700 ppmw.

In the present invention, the one or more phenolic antioxidants may be any phenolic antioxidant. Preferably, the one phenolic antioxidant or at least one of the phenolic antioxidants is a sterically hindered phenolic antioxidant, which may contain 1 or more hindered phenolic groups. For example, the sterically hindered phenolic antioxidant may contain 1, 2, 3 or 4 hindered phenolic groups, preferably 1 hindered phenolic group.

The one phenolic antioxidant or at least one of the phenolic antioxidants may comprise one or more benzene rings, preferably one benzene ring, wherein the benzene ring or at least one of the benzene rings, is a benzene ring which is substituted by a hydroxyl (—OH) group and by another group at one or both of the ortho positions, preferably at both ortho positions, relative to the hydroxyl group, and by another group at the para position relative to the hydroxyl group. Preferably, said other group at one or both of the ortho positions is a $C_1$-$C_8$ alkyl group, more preferably a $C_1$-$C_4$ alkyl group, more preferably a $C_4$ alkyl group, most preferably a tertiary butyl group. Preferably, in case both ortho positions are substituted, the groups at both of the ortho positions are the same. Alternatively, said 2 groups are not the same, in which case one group may be a tertiary butyl group and the other group may be a methyl group.

Further, the above-mentioned other group at the para position may be the same as the group at one or both of the ortho positions. However, preferably, said other group at the para position is different. Said other group at the para position may be a $C_1$-$C_{20}$ alkyl group or a $C_1$-$C_{10}$ alkyl group or a $C_1$-$C_4$ alkyl group or a methyl group. However, preferably, said other group at the para position is a group of Formula (I):

$$-R^1-C(=O)-O-R^2 \qquad \text{Formula (I)}$$

wherein $R^1$ is bonded to the benzene ring and is a $C_1$-$C_6$ alkylene group and $R^2$ is a $C_1$-$C_{24}$ alkyl group or a $C_1$-$C_{24}$ alkylene group. Preferably, $R^1$ is a linear alkylene group. Further, preferably, $R^1$ is a $C_1$-$C_4$ alkylene group, more preferably a $C_1$-$C_2$ alkylene group, most preferably a $C_2$ alkylene group. Suitable examples of $R^1$ are —$CH_2$— and —$CH_2CH_2$—. Most preferably, $R^1$ is —$CH_2CH_2$—. Further, $R^2$ may be a $C_1$-$C_{24}$ alkyl group in case the phenolic antioxidant comprises one benzene ring, or $R^2$ may be a $C_1$-$C_{24}$ alkylene group in case the phenolic antioxidant comprises two or more benzene rings. Said $C_1$-$C_{24}$ alkyl group may be branched or linear, preferably linear. Said $C_1$-$C_{24}$ alkylene group is preferably linear.

In a case where above-mentioned $R^2$ is a $C_1$-$C_{24}$ alkylene group, $R^2$ may be bonded to another group which links 2 or more benzene rings substituted by above-mentioned group of Formula (I). In the latter case, $R^2$ is preferably a $C_1$-$C_{10}$ alkylene group, more preferably a $C_1$-$C_8$ alkylene group, more preferably a $C_1$-$C_6$ alkylene group, more preferably a $C_1$-$C_4$ alkylene group. Most preferably, said alkylene groups are linear. Further, most preferably, said alkylene group is —$CH_2CH_2$— or —$CH_2$—.

It is preferred that above-mentioned $R^2$ is a $C_1$-$C_{24}$ alkyl group. In the latter case, $R^2$ is preferably a $C_4$-$C_{24}$ alkyl group, more preferably a $C_6$-$C_{20}$ alkyl group, most preferably a $C_8$-$C_{18}$ alkyl group. Further, in the latter case, $R^2$ may be a $C_6$-$C_{24}$ alkyl group or a $C_8$-$C_{24}$ alkyl group or a $C_{10}$-$C_{24}$ alkyl group or a $C_{12}$-$C_{24}$ alkyl group or a $C_{14}$-$C_{22}$ alkyl group or a $C_{16}$-$C_{20}$ alkyl group. Said alkyl groups may be branched or linear, preferably linear. Most preferably, said alkyl group is a linear $C_{18}$ alkyl group.

In particular, in the present invention, the one phenolic antioxidant or at least one of the phenolic antioxidants may be a compound of Formula (II):

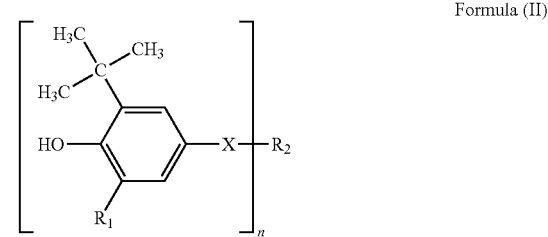

Formula (II)

wherein
$R_1$ is hydrogen or $C_1$-$C_8$ alkyl,
n is 1, 2 or 4,
X is —$CH_2CH_2$—C(=O)—O— where —$CH_2CH_2$ is bonded to the benzene ring and C(=O)—O— is bonded to $R_2$, and
if n is 1: $R_2$ is $C_1$-$C_{24}$ alkyl, or if n is 2: $R_2$ is $C_2$-$C_{12}$ alkylene or $C_4$-$C_{12}$ alkylene interrupted by oxygen, or if n is 4: $R_2$ is $C_4$-$C_{10}$ alkanetetrayl.

In Formula (II), $R_1$ is hydrogen or $C_1$-$C_8$ alkyl. Preferably, $R_1$ is $C_1$-$C_8$ alkyl, more preferably $C_1$-$C_4$ alkyl, more preferably $C_4$ alkyl. For example, $R_1$ may be methyl or tertiary butyl. Most preferably, $R_1$ is tertiary butyl.

In Formula (II), n may be 1, 2 or 4. Preferably, n is 1.

In Formula (II), X is —$CH_2CH_2$—$C(=O)$—$O$— where —$CH_2CH_2$ is bonded to the benzene ring and $C(=O)$—$O$— is bonded to $R_2$.

If in Formula (II) n is 1, $R_2$ is $C_1$-$C_{24}$ alkyl. $R_2$ is preferably $C_4$-$C_{24}$ alkyl, more preferably $C_6$-$C_{20}$ alkyl, most preferably $C_8$-$C_{18}$ alkyl. Further, $R_2$ may be $C_6$-$C_{24}$ alkyl or $C_8$-$C_{24}$ alkyl or $C_{10}$-$C_{24}$ alkyl or $C_{12}$-$C_{24}$ alkyl or $C_{14}$-$C_{22}$ alkyl or $C_{16}$-$C_{20}$ alkyl. Said alkyl groups may be branched or linear, preferably linear. Suitable examples of said alkyl groups comprise methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl. Most preferably, said alkyl group is a linear $C_{18}$ alkyl group (n-octadecyl).

If in Formula (II) n is 2, $R_2$ is $C_2$-$C_{12}$ alkylene or $C_4$-$C_{12}$ alkylene interrupted by oxygen. If $R_2$ is $C_2$-$C_{12}$ alkylene, $R_2$ is preferably $C_2$-$C_{10}$ alkylene, more preferably $C_2$-$C_8$ alkylene, more preferably $C_4$-$C_8$ alkylene, most preferably $C_4$-$C_6$ alkylene. Said alkylene groups may be branched or linear, preferably linear. Suitable examples of said alkylene groups comprise ethylene, propylene, tetramethylene, pentamethylene, hexamethylene, heptamethylene, octamethylene, decamethylene or dodecamethylene. If $R_2$ is $C_4$-$C_{12}$ alkylene interrupted by oxygen, it can be interrupted by oxygen one or more times, and $R_2$ is preferably $C_4$-$C_{10}$ alkylene interrupted by oxygen, more preferably $C_4$-$C_8$ alkylene interrupted by oxygen, most more preferably $C_4$-$C_6$ alkylene interrupted by oxygen. Suitable examples of said alkylene groups interrupted by oxygen comprise —$CH_2$—$O$—$CH_2CH_2$—$O$—$CH_2$—, —$CH_2$—(O—$CH_2CH_2$—$)_2$O—$CH_2$—, —$CH_2$—(O—$CH_2CH_2$—$)_3$O—$CH_2$—, —$CH_2$—(O—$CH_2CH_2$—$)_4$O—$CH_2$—, —$CH_2CH_2$—O—$CH_2CH_2$—, —$CH_2CH_2$—O—$CH_2CH_2$—O—$CH_2CH_2$—, —$CH_2CH_2$—(O—$CH_2CH_2$—$)_2$O—$CH_2CH_2$—, and —$CH_2CH_2$—(O—$CH_2CH_2$—$)_3$O—$CH_2CH_2$—. Preferably, said alkylene group interrupted by oxygen is —$CH_2CH_2$—O—$CH_2CH_2$— or —$CH_2CH_2$—O—$CH_2CH_2$—O—$CH_2CH_2$—, more preferably —$CH_2CH_2$—O—$CH_2CH_2$—O—$CH_2CH_2$—.

If in Formula (II) n is 4, $R_2$ is $C_4$-$C_{10}$ alkanetetrayl. Suitable examples of $C_4$-$C_{10}$ alkanetetrayl groups comprise

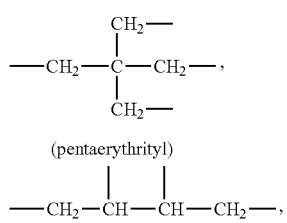

(pentaerythrityl)

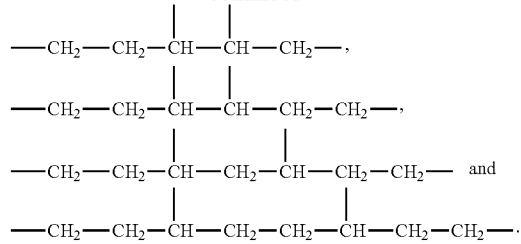

Pentaerythrityl is preferred.

Further, in the present invention, the one phenolic antioxidant or at least one of the phenolic antioxidants may be one as disclosed in WO2006111492, the disclosure of which is incorporated herein by reference. In particular, in the present invention, said phenolic antioxidant may be one as disclosed in claim 2 and at pages 2 to 11 of WO2006111492.

Still further, in the present invention, the one phenolic antioxidant or at least one of the phenolic antioxidants may be one as disclosed at pages 517 to 522 of the "Handbook of Polyolefins", Second Edition (Chapter 20: "Additives for Polyolefins", by Cornelia Vasile), the disclosure of which is incorporated herein by reference.

Preferably, in the present invention, the one phenolic antioxidant or at least one of the phenolic antioxidants is selected from the group consisting of:

1) octadecyl-3-(3,5-di-tert-butyl-4-hydroxyphenyl)propionate which is a compound of Formula (III) and which is commercially available as Irganox 1076 at BASF:

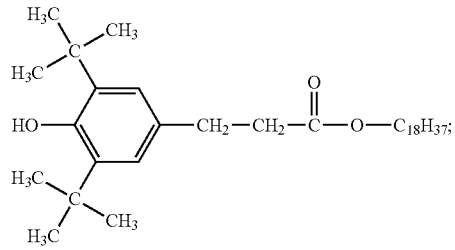

Formula (III)

2) $C_{13-15}$-alkyl-3-(3,5-di-tert-butyl-4-hydroxyphenyl)propionate which is a mixture of compounds of Formula (III) wherein the octadecyl ($C_{18}H_{37}$) group is replaced by a $C_{13-15}$-alkyl group and which is commercially available as Anox 1315 at Addivant;

3) iso-$C_8$-alkyl-3-(3,5-di-tert-butyl-4-hydroxyphenyl) propionate which is a compound of Formula (IV), wherein iso-$C_8$-alkyl is 2-ethylhexyl, and which is commercially available as Irganox 1135 at BASF:

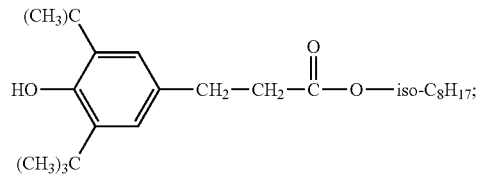

Formula (IV)

4) triethylene glycol bis(3-tert-butyl-4-hydroxy-5-methylphenyl)propionate which is a compound of Formula (V) and which is commercially available as Irganox 245 at BASF:

Formula (V)

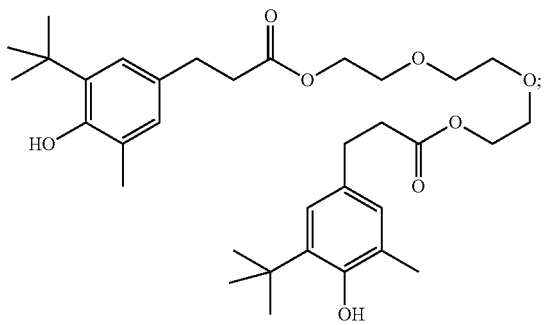

and 5) pentaerythritol tetrakis(3-(3,5-di-tert-butyl-4-hydroxyphenyl)propionate which is a compound of Formula (VI) and which is commercially available as Irganox 1010 at BASF:

Formula (VI)

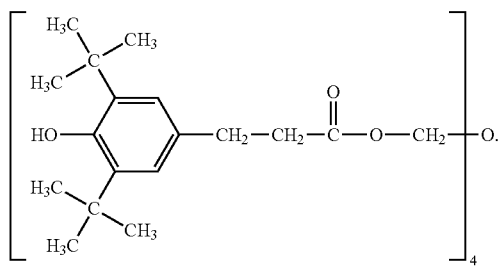

Most preferably, in the present invention, the one phenolic antioxidant or at least one of the phenolic antioxidants is octadecyl-3-(3,5-di-tert-butyl-4-hydroxyphenyl)propionate of Formula (III). The latter phenolic antioxidant is especially advantageous, also because this antioxidant does not significantly contribute to the above-mentioned VOC/FOG emission in a polyurethane foam industry wide accepted test called "VDA-278". The VDA-278 test involves a thermal desorption analysis of organic emissions for the characterization of non-metallic materials for automobiles. No VOC/FOG emission (or a reduced VOC/FOG emission) is relevant in case where consumers (e.g. in automobiles, airplanes) come into close contact with the final polyurethane foam product. Whereas said phenolic antioxidant of Formula (III) enables polyurethane foam containing it to pass said VDA-278 test, polyurethane foam containing "PUR55", which is a commercial antioxidant system comprising a phenolic antioxidant and an aminic antioxidant, fails that same test. Furthermore, advantageously, said phenolic antioxidant of Formula (III) has been approved by the above-mentioned "FDA". This means that the polyurethane foam made using said antioxidant alone may advantageously be used in food applications. Finally, advantageously, said antioxidant is a commodity antioxidant which is widely available.

In the present invention, the one phenolic antioxidant or at least one of the phenolic antioxidants has a molecular weight which is preferably higher than 250 g/mol, more preferably at least 300 g/mol, more preferably at least 350 g/mol, more preferably at least 390 g/mol, more preferably at least 450 g/mol, more preferably at least 500 g/mol. Suitably, the molecular weight is at most 1,500 g/mol, more suitably at most 1,200 g/mol, more suitably at most 1,000 g/mol, more suitably at most 800 g/mol, more suitably at most 700 g/mol, most suitably at most 600 g/mol.

In the present process, a polyurethane foam is prepared by reacting a polyether polyol with a polyisocyanate. First, the polyether polyol (hereinafter also referred to as "polyol") is further described below, followed by a description of the polyisocyanate. The following definitions for some polyol features apply.

The term "molecular weight" is used herein to refer to number average molecular weight, unless otherwise specified or context requires otherwise. The number average molecular weight of a polyol can be measured by gel permeation chromatography (GPC) or vapor pressure osmometry (VPO).

The term "hydroxyl value" is used herein to refer to the milligrams of potassium hydroxide equivalent to the hydroxyl content in one gram of polyol determined by wet method titration.

The term "equivalent weight" is used herein to refer to the weight of polyol per reactive site. The equivalent weight is 56100 divided by the hydroxyl value of the polyol.

The term "functionality" is used herein to refer to the average number of reactive sites per molecule of polyol. The functionality is determined by the number average molecular weight of the polyol divided by the equivalent weight of the polyol.

In the present invention, one or more polyols may be used. Further, one or more polymers may be dispersed in said one or more polyols. If 2 or more polyols are used, they may be provided as a polyol mixture, or the polyols may be provided separately to form a polyol mixture in situ.

In general, the polyol may be prepared by ring-opening polymerization of alkylene oxide, in particular by reacting a hydroxyl containing compound with an alkylene oxide, such as for example ethylene oxide, propylene oxide, butylene oxide and/or mixtures thereof. The alkylene oxide may, for example, be propylene oxide, optionally together with one or more other alkylene oxides like ethylene oxide or butylene oxide. Suitable hydroxyl containing starting compounds include polyfunctional alcohols, generally containing from 2 to 8 hydroxyl groups. Examples of such alcohols comprise glycols, glycerol, pentaerythritol, trimethylolpropane, triethanolamine, sorbitol and mannitol. Advantageously, propylene glycol (MPG), glycerol or a combination of both may be is used as starting compound. A strong base like potassium hydroxide or a similar metal hydroxide salt may be used as a catalyst in ring-opening polymerization of alkylene oxide to obtain a polyol. However, catalysts such as composite metal cyanide complex catalysts can also be used.

In the present invention, a polyether polyol is used (herein also referred to as "polyol"). Preferably, in the present invention, said polyether polyol does not contain carbonate linkages (or carbonate units). It is especially preferred that said polyether polyol does not contain ester linkages (or ester units). Further, preferably, said polyether polyol consists of ether linkages.

The polyol may be prepared by ring-opening polymerization of alkylene oxide in the presence of a composite metal cyanide complex catalyst. Composite metal cyanide complex catalysts are frequently also referred to as double metal cyanide (DMC) catalysts. A composite metal cyanide complex catalyst is typically represented by the following formula (1):

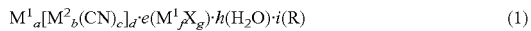
$$M^1_a[M^2_b(CN)_c]_d \cdot e(M^1X_g) \cdot h(H_2O) \cdot i(R) \qquad (1)$$

wherein each of $M^1$ and $M^2$ is a metal, X is a halogen atom, R is an organic ligand, and each of a, b, c, d, e, f, g, h and i is a number which is variable depending upon the atomic balances of the metals, the number of organic ligands to be coordinated, etc.

In the above formula (1), $M^1$ is preferably a metal selected from Zn(II) or Fe(II). In the above formula, $M^2$ is preferably a metal selected from Co(III) or Fe(III). However, other metals and oxidation states may also be used, as is known in the art.

In the above formula (1), R is an organic ligand and is preferably at least one compound selected from the group consisting of an alcohol, an ether, a ketone, an ester, an amine and an amide. As such an organic ligand, a water-soluble one may be used. Specifically, one or more compounds selected from tert-butyl alcohol, n-butyl alcohol, iso-butyl alcohol, tert-pentyl alcohol, isopentyl alcohol, N,N-dimethyl acetamide, glyme (ethylene glycol dimethyl ether), diglyrste (diethylene glycol dimethyl ether), triglyme (triethylene glycol dimethyl ether), ethylene glycol mono-tert-butylether, iso-propyl alcohol and dioxane, may be used as organic ligand(s). The dioxane may be 1,4-dioxane or 1,3-dioxane and is preferably 1,4-dioxane. Most preferably, the organic ligand or one of the organic ligands in the composite metal cyanide complex catalyst is tert-butyl alcohol. Further, as an alcohol organic ligand, a polyol, preferably a polyether polyol may be used. More preferably, a poly(propylene glycol) having a number average molecular weight in the range of from 500 to 2,500 Dalton, preferably 800 to 2,200 Dalton, may be used as the organic ligand or one of the organic ligands. Most preferably, such poly(propylene glycol) is used in combination with tert-butyl alcohol as organic ligands. The composite metal cyanide complex catalyst can be produced by known production methods.

The one or more polyols may have a number average molecular weight in the range of from 300 to 12000 Daltons, suitably of from 300 to 8000 Daltons, more suitably of from 500 to 6000 Daltons, most suitably of from 500 to 4000 Daltons.

Further, the one or more polyols may have a functionality in the range of from 2 to 6, suitably of from 2 to 5. Preferably, the functionality of the one or more polyols is higher than 2, more preferably of from 2.5 to 4, most preferably of from 2.5 to 3.5.

Further, the one or more polyols may have a hydroxyl value of from 10 to 600 mg KOH/g, suitably of from 20 to 500 mg KOH/g, more suitably of from 30 to 300 mg KOH/g.

The one or more polyols may advantageously be propylene oxide (PO)- and optionally ethylene oxide (EO)-derived, i.e. comprise PO and/or EO derived oxyalkene moieties. Preferably, in the present invention, the one or more polyols only contain PO derived oxyalkene moieties or PO and EO derived oxyalkene moieties. In case the one or more polyols contain PO and EO derived oxyalkene moieties, it is preferred that the EO derived oxyalkene moieties are randomly distributed in said one or more polyols.

The polyol (or one of the polyols) may comprise only PO moieties (in combination with a hydroxyl containing starting compound). Where EO moieties are present in the polyol they may be randomly co-polymerised with PO moieties. The polyol may contain EO moieties in an amount in the range of from 1 to 25 wt. %, suitably of from 5 to 20 wt. %. The amount of EO moieties in wt. % is based on the total of oxyalkylene units present and may be measured, for example, according to ASTM D4875.

The polyol (or one of the polyols) may comprise primary hydroxyl groups. The percentage of primary hydroxyl groups (also referred to as "primary hydroxyl content (PHC)") in the range of from 1 to 100, suitably of from 5 to 90, more suitably of from 10 to 70, most suitably of from 10 to 50.

As mentioned above, one or more polymers may be dispersed in the polyol(s). In particular, a solid polymer may be dispersed in the polyol, thereby forming a "polymer polyol". The base polyol of such polymer polyol may have properties as described above for the polyo(s) in general. Thus, in general, a polymer polyol is a dispersion of a solid polymer in a liquid polyol. Such systems are well known in the art and are normally prepared by polymerising one or more ethylenically unsaturated monomers in the presence of a free radical catalyst.

Examples of such polymer polyol systems and methods for their preparation are disclosed in, for instance, EP076491A2, EP0343907A2 and EP0495551A2. Polyurea or polyurethane polymers are also known to be useful as the dispersed polymer in polymer polyols instead of the polymers based on ethylenically unsaturated monomers.

The polymer dispersed in the base polyol, may in principle be any such polymer known to be applicable for this purpose. Thus, suitable polymers include the polymers based on ethylenically unsaturated monomers and particularly polymers of vinyl aromatic hydrocarbons, like styrene, alpha-methyl styrene, methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred polymers, however, are polystyrene and styrene-acrylonitrile (SAN) copolymers. Another suitable class of polymers are the polyurea and polyurethane polymers. Particularly the condensation products of primary amines or polyhydric alcohol amines and aromatic diisocyanates are very useful in this respect. One suitable polymer is the condensation product of triethanolamine and toluene diisocyanate (TDI).

The dispersed polymer is suitably present in an amount of from 10 to 55 wt. %, suitably 15 to 55 wt. %, more suitably 30 to 45 wt. %, based on total weight of the polyol and polymer.

The present invention also relates to a polyether polyol composition, comprising a polyether polyol and an antioxidant, wherein the antioxidant consists of one phenolic antioxidant or two or more phenolic antioxidants, the one or more phenolic antioxidants contain no atoms other than carbon, hydrogen and oxygen, and the amount of the one or more phenolic antioxidants is of from 2,300 to less than 10,000 parts per million by weight (ppmw) based on the polyether polyol.

All of the above-described features, embodiments and preferences in relation to the polyether polyol and the one or more phenolic antioxidants as used in the present polyurethane preparation process, are equally applicable to the polyether polyol and the one or more phenolic antioxidants from the above-mentioned polyether polyol composition of the present invention.

In the context of the present invention, in a case where a composition comprises two or more components, these components are to be selected in an overall amount not to exceed 100 wt. %.

Further, while the process and composition of the present invention may be described in terms of "comprising", "containing" or "including" one or more various described steps and components, respectively, they can also "consist essentially of" or "consist of" said one or more various described steps and components, respectively.

In the present process, the polyether polyol is reacted with a polyisocyanate in the presence of a blowing agent. The polyisocyanate may be an aromatic polyisocyanate or an aliphatic polyisocyanate, preferably an aromatic polyisocyanate.

The aromatic polyisocyanate may for example comprise toluene diisocyanate (TDI) or polymeric TDI, xylylene diisocyanate, tetramethylxylylene diisocyanate, methylene diphenyl diisocyanate (MDI) or polymeric MDI (i.e. polymethylene polyphenyl isocyanate), or a modified product thereof. Preferably, the aromatic polyisocyanate comprises toluene diisocyanate (TDI), i.e. non-polymeric TDI. The TDI may be a mixture of 80 wt. % of 2,4-TDI and 20 wt. % of 2,6-TDI, which mixture is sold as "TDI-80".

Further, the aliphatic polyisocyanate may for example comprise hexamethylene diisocyanate, dicyclohexylmethane diisocyanate, lysine diisocyanate or isophorone diisocyanate, or a modified product thereof.

Further, the polyisocyanate may be any mixture of two or more of the polyisocyanates mentioned above. For example, the polyisocyanate may be a mixture of TDI and MDI, in particular a mixture wherein the weight ratio of TDI:MDI varies from 10:90 to 90:10.

In the present invention, the blowing agent may be a chemical blowing agent or a physical (non-chemical) blowing agent. Within the present specification, by "chemical blowing agent" reference is made to a blowing agent that may only provide a blowing effect after it has chemically reacted with another compound.

Preferably, in the present invention, the blowing agent is a chemical blowing agent. Further, preferably, the chemical blowing agent comprises water. As also mentioned above, water reacts with isocyanate groups of the polyisocyanate, thereby releasing carbon dioxide which causes the blowing to occur. Further, preferably, substantially no physical (non-chemical) blowing agent is added in the present process.

However, other suitable blowing agents, such as for example, acetone, gaseous or liquid carbon dioxide, halogenated hydrocarbons, aliphatic alkanes and alicyclic alkanes may be employed additionally or alternatively.

Due to the ozone depleting effect of fully chlorinated, fluorinated alkanes (CFC's) the use of this type of blowing agent is generally not preferred, although it is possible to use them within the scope of the present invention.

Halogenated alkanes, wherein at least one hydrogen atom has not been substituted by a halogen atom (the so-called HCFC's) have no or hardly any ozone depleting effect and therefore are the preferred halogenated hydrocarbons to be used in physically blown foams. One suitable HCFC type blowing agent is 1-chloro-1,1-difluoroethane.

The above blowing agents may be used singly or in mixtures of two or more.

In the present invention, the amount of the blowing agent(s) is determined by the density of the polyurethane foam to be prepared which should be lower than 25 kg/m$^3$. Such relatively low density can be obtained by using a relatively high amount of the blowing agent(s). A skilled person can readily determine the amount of blowing agent (physical and/or chemical blowing agent) needed to obtain a foam density lower than 25 kg/m$^3$ or lower than any one of the other above-mentioned upper limits.

Preferably, in the present invention, in a case where the blowing agent comprises water, water is used in an amount of from 3 to 10 parts per hundred parts by weight of polyol (pphp), more preferably of from 3 to 8 pphp, more preferably of from 3 to 7 pphp, more preferably of from 4 to 7 pphp, most preferably of from 4 to 6 pphp. Preferably, water is used in an amount which is at least 3 pphp, more preferably at least 3.5 pphp, more preferably at least 4 pphp, more preferably at least 4.5 pphp, most preferably at least 5 pphp. Further, preferably, water is used in an amount which is at most 10 pphp, more preferably at most 9 pphp, more preferably at most 8 pphp, more preferably at most 7 pphp, most preferably at most 6 pphp.

In case of halogenated hydrocarbons, aliphatic alkanes and alicyclic alkanes, the amount of the blowing agent may be of from 1 to 50 parts per hundred parts by weight of polyol (pphp), suitably of from 1 to 30 pphp, more suitably of from 1 to 20 pphp.

In the present invention, the density of the polyurethane foam to be prepared is lower than 25 kg/m$^3$, preferably at most 23 kg/m$^3$, more preferably at most 22 kg/m$^3$, more preferably at most 21 kg/m$^3$, more preferably at most 20 kg/m$^3$, more preferably at most 19 kg/m$^3$, more preferably at most 18 kg/m$^3$, most preferably at most 17 kg/m$^3$. Further, preferably, the density is at least 6 kg/m$^3$, more preferably at least 8 kg/m$^3$, more preferably at least 10 kg/m$^3$, more preferably at least 12 kg/m$^3$, more preferably at least 13 kg/m$^3$, more preferably at least 14 kg/m$^3$, most preferably at least 15 kg/m$^3$. Thus, the density of the polyurethane foam to be prepared may be of from 6 to lower than 25 kg/m$^3$, preferably of from 10 to lower than 25 kg/m$^3$, more preferably of from 12 to 22 kg/m$^3$, more preferably of from 13 to 20 kg/m$^3$, most preferably of from 14 to 18 kg/m$^3$. The density may be determined by measuring the weight of a 10 cm*10 cm*5 cm cube of foam, for example, according to ASTM D3574.

Further, preferably, the polyurethane foam to be prepared in the present process is a flexible polyurethane foam. Further, said flexible polyurethane foam is suitably a slabstock foam. Within the present specification, by "slabstock" foam reference is made to a foam that is made by applying a free rise (unconstrained rise) of the foam. Polyether polyols, which are suitable for preparing flexible polyurethane foams therefrom (also referred to as flexible polyether polyols), have a relatively high molecular weight (for example 3,000 to 6,500 Dalton) and a relatively low nominal functionality (Fn; for example 2 to 3 hydroxyl groups per molecule). Reference is made to M. Ionescu, "Chemistry and Technology of Polyols for Polyurethanes", Rapra Technology Limited, 2005, page 8.

In the present process, the isocyanate index is higher than 100. Within the present specification, "isocyanate index" is calculated as 100 times the mole ratio of —NCO groups (isocyanate groups) to NCO-reactive groups in the reaction mixture. In other words, the "isocyanate index is defined as: [(actual amount of isocyanate)/(theoretical amount of isocyanate)]*100, wherein the "theoretical amount of isocyanate" equals 1 equivalent isocyanate (NCO) group per 1 equivalent isocyanate-reactive group.

Such "isocyanate-reactive groups" as referred to above include for example OH groups from the polyol and from any water that may be used as a blowing agent. Isocyanate groups also react with water.

In the present invention, the isocyanate index (or NCO index) may be at most 150, more suitably at most 140, more suitably at most 130, most suitably at most 125. The isocyanate index is higher than 100, preferably higher than 105, most preferably higher than 110. Suitably, the isocyanate index is higher than 100 and at most 150. More suitably, it is of from 105 to 140, more suitably of from 110 to 130, most suitably of from 110 to 125.

Further, in the present process, the maximum temperature during the preparation of the polyurethane foam is higher than 140° C. Within the present specification, by said "maximum temperature" reference is made to the maximum temperature in the (developing) foam. Said maximum temperature can be measured in the core of the (developing) foam.

In the present process, the maximum temperature during the preparation of the polyurethane foam is higher than 140° C. Preferably, it is at most 200° C., more preferably at most 190° C., most preferably at most 185° C. Further, preferably, said maximum temperature is of from 150 to 190° C., more preferably of from 160 to 190° C.

Additionally, other components may also be present during the polyurethane preparation process of the present invention, such as one or more polyurethane catalysts, surfactants and/or cross-linking agents.

Polyurethane catalysts are known in the art and include many different compounds. For the purpose of the present invention, suitable catalysts include tin-, lead- or titanium-based catalysts, preferably tin-based catalysts, such as tin salts and dialkyl tin salts of carboxylic acids.

Specific examples are stannous octoate, stannous oleate, dibutyltin dilaureate, dibutyltin acetate and dibutyltin diacetate. Other suitable catalysts are tertiary amines, such as, for instance, bis(2,2'-dimethylamino)ethyl ether, trimethylamine, triethylamine, triethylenediamine and dimethylethanolamine (DMEA). Examples of commercially available tertiary amine catalysts are those sold under the tradenames Niax, Tegoamin and Dabco (all trademarks). The catalyst is typically used in an amount of from 0.01 to 2.0 parts by weight per hundred parts by weight of polyether polyol (php). Preferred amounts of catalyst are from 0.05 to 1.0 php.

The use of foam stabilisers (surfactants) is well known. Organosilicone surfactants are most conventionally applied as foam stabilisers in polyurethane production. A large variety of such organosilicone surfactants is commercially available. Usually, such foam stabiliser is used in an amount of from 0.01 to 5.0 parts by weight per hundred parts by weight of polyol (pphp). Preferred amounts of stabiliser are from 0.25 to 2.0 pphp, more preferably of from 0.25 to 1.0 pphp.

The use of cross-linking agents in the production of polyurethane foams is also well known. Polyfunctional glycol amines are known to be useful for this purpose. The polyfunctional glycol amine which is most frequently used and is also useful in the preparation of polyurethane foams, especially flexible polyurethane foams, is diethanol amine, often abbreviated as DEOA. If used at all, the cross-linking agent is applied in amounts up to 2 parts by weight per hundred parts by weight of polyol (pphp), but amounts in the range of from 0.01 to 0.5 pphp are most suitably applied.

In addition, other well known auxiliaries, such as colorants, flame retardants and fillers, may also be used during the polyurethane preparation process of the present invention.

The process of the invention may involve combining the polyol, the polyisocyanate, the blowing agent, a catalyst and optionally surfactant, crosslinker, flame retardant, colorant and/or filler, in any suitable manner to obtain the polyurethane foam. For example, the present process may comprise stirring the polyol, the blowing agent, a catalyst and any other optional component(s) except the polyisocyanate together for a period of at least 1 minute; and adding the polyisocyanate under stirring.

Further, the process of the invention may comprise forming the foam into a shaped article before it fully sets. Suitably, forming the foam may comprise pouring the liquid mixture containing all components into a mould before gelling is complete.

The present invention also relates to a polyurethane foam obtainable by the above-described process, and to a shaped article comprising said polyurethane foam.

The invention is further illustrated by the following Examples.

EXAMPLES

The materials (polyols, polyisocyanate and other components) used in the polyurethane foam experiments are described in Table 1 below.

TABLE 1

| POLYOLS | |
| --- | --- |
| Polyol A | EO/PO based polyether polyol: MW = 3,500 g/mole; OH number = 48 mg KOH/g; EO content = 10.5%; PHC = 10%; nominal functionality = 2.8; 1,500 ppmw of Irganox 5057 (aminic antioxidant) and 3,000 ppmw of Irganox 1076 (phenolic antioxidant) |
| Polyol B | Polyol B was the same as Polyol A except that it did not contain Irganox 5057 but only 4,500 ppmw of Irganox 1076 (phenolic antioxidant) |
| Polyol C | Polyol C was the same as Polyol A except that it did not contain Irganox 1076 but 3,000 ppmw of Irganox 1135 (phenolic antioxidant). |
| POLYISOCYANATE | |
| TDI-80 | 80:20 (by weight) blend of 2,4- and 2,6-isomers of TDI commercially available from Mitsui; free NCO content = 48.3% |
| OTHER COMPONENTS | |
| Dabco T-9 | Stannous octoate catalyst, commercially available from Air Products and Chemicals |
| Niax A33 | Amine based catalyst available from Momentive Performance Materials |
| Niax L580 | Silicone based surfactant commercially available from Momentive Performance Materials |

MW = molecular weight
ppmw = parts per million by weight
PHC = pimary hydroxyl content Polyol A contained two antioxidants: 1) Irganox 1076 which is a phenolic antioxidant of above Formula (III); and 2) Irganox 5057 which is an aminic antioxidant. Irganox 5057 is a technical mixture obtained by the reaction of diphenylamine with diisobutylene and is commercially available at BASF. Polyol C also contained two antioxidants: 1) Irganox 1135 which is a phenolic antioxidant of above Formula (IV); and 2) said Irganox 5057. Polyol B only contained a phenolic antioxidant, namely said Irganox 1076. Polyol B is an example of the polyether polyol composition in accordance with the present invention.

One or more of the following properties of the foams thus obtained were measured:
1) Density according to ASTM D3574 (sample size 100*100*50 mm$^3$, 2 samples/foam).

2) Resilience according to ASTM D3574—Test H (sample size 100*100*50 mm³, 2 samples/foam), which involves dropping a 16 mm diameter steel ball bearing onto a sample and measuring the percentage height that the ball bearing rebounded.

3) Hardness Compression Load Deflection at 40% compression (CLD40%) according to DIN 53577 (sample size 100*100*50 mm³, 2 samples/foam), which involves measuring the force required to compress a sample by 40%.

4) Foam scorch measurement: A foam sample of 1 meter cube size (1*1*1 m³) is made and is then cut right across the centre into two halves. And then a chromometer is used to measure the discoloration at the centre ("scorch") and at the furthest corner of the sample ("no scorch"). The extent of scorching is represented by $\Delta E_{ab}$ which in turn is measured as a function of the following three parameters: "L"=lightness; "a"=blue index; "b"=yellowness index. $\Delta E_{ab}$ is calculated using formula (2):

$$\Delta E_{ab} = \sqrt{(\Delta L)^2 + (\Delta a)^2 + (\Delta b)^2} \quad (2)$$

wherein:
$\Delta L = L_{scorch} - L_{no\ scorch}$
$\Delta a = a_{scorch} - a_{no\ scorch}$
$\Delta b = b_{scorch} - b_{no\ scorch}$ 5) UV discoloration test: 50*100*30 mm³ foam samples are placed inside a UV oven at 50° C. The difference in discoloration at t=0 and at t=6 hours is measured using a chromometer in the same way as done for scorch testing.

The non-isocyanate components shown in Table 2 below were mixed in a high speed mixer at about 900 rpm for 60 seconds. Then the isocyanate (TDI) component was added and the mixture was stirred for around 10 seconds and then poured into a box of dimensions of 1 m*1 m*1 m to form a foam. By using such relatively large box, the exotherm in large scale foam production is mimicked. The maximum temperature during the polyurethane foam preparation was observed to be 172° C. (foams 1 and 2) and 184° C. (foams 3 and 4). After about 24 hours, the foam was sliced as per the requirements and its physical properties, scorch and UV discoloration were measured. The results of these measurements are also shown in Table 2 below.

TABLE 2

| Formulation | Invention | Comparison | Invention | Comparison |
|---|---|---|---|---|
| Polyol A (pbw) | 0 | 100 | 0 | 0 |
| Polyol B (pbw) | 100 | 0 | 100 | 0 |
| Polyol C (pbw) | 0 | 0 | 0 | 100 |
| Irganox 5057 in polyol (ppmw) | 0 | 1,500 | 0 | 1,500 |
| Irganox 1076 in polyol (ppmw) | 4,500 | 3,000 | 4,500 | 0 |
| Irganox 1135 in polyol (ppmw) | 0 | 0 | 0 | 3,000 |
| Water (pphp) | 5.5 | 5.5 | 6.0 | 6.0 |
| Niax A33 (pphp) | 0.18 | 0.18 | 0.14 | 0.14 |
| Niax L580 (pphp) | 1.3 | 1.3 | 1.8 | 1.8 |
| Dabco T-9 (pphp) | 0.19 | 0.19 | 0.21 | 0.21 |
| TDI-80 (isocyanate index) | 115 | 115 | 115 | 115 |

TABLE 2-continued

| Properties | Foam 1 | Foam 2 | Foam 3 | Foam 4 |
|---|---|---|---|---|
| Density (kg/m³) | 16.3 | 16.3 | 15.3 | 15.0 |
| CLD40% (kPa) | 2.8 | 3.0 | 3.8 | 3.8 |
| Resilience (%) | 34 | 31 | 32 | 25 |
| Total scorch performance ($\Delta E_{ab}$) | 1.5 | 1.6 | 2.3 | 3.0 |
| Yellowness index ($\Delta b$) | 1.3 | 1.1 | 1.7 | 1.3 |
| UV discoloration ($\Delta E$) | 6.4 | 8.2 | 5.7 | 7.2 |

Regarding Table 2:
1) pbw=parts by weight
2) pphp=parts per 100 parts of polyol (by weight)
3) A difference between 2 foams in relation to 1 or more of the above-mentioned properties $\Delta E_{ab}$, $\Delta b$ and $\Delta E$ which is up to 1, is still within the experimental error margin and is acceptable as such difference is not recognized by the human eye.

As can be seen from Table 2 above, the foams produced in accordance with the present invention have comparable scorch performance, without significantly affecting other important flexible foam properties such as density, CLD40% and resilience, when compared to the cases where instead of a phenolic antioxidant (present invention) a combination of a phenolic antioxidant and an aminic antioxidant was used (comparison). This can be seen by comparing foam 1 (invention) with foam 2 (comparison) and by comparing foam 3 (invention) with foam 4 (comparison). Thus, advantageously, no non-phenolic antioxidant (like the above-mentioned aminic antioxidant) is needed in addition to the phenolic antioxidant to provide sufficient scorch protection for low-density polyurethane foam production. Thus, surprisingly, no synergistic effect in relation to scorch protection in preparing low-density polyurethane foam was observed by using a combination of phenolic and aminic antioxidants (comparison) instead of a phenolic antioxidant without any aminic antioxidant (present invention). This is even more surprising when considering that the total molar antioxidant amount used in producing foams in accordance with the present invention (foams 1 and 3) is lower than the total molar antioxidant amounts used in producing the comparison foams (foams 2 and 4). The molecular weights of the 3 antioxidants are as follows: Irganox 1076=531 g/mol; Irganox 1135=390 g/mol; Irganox 5057=361 g/mol.

Furthermore, advantageously, as appears from the UV discoloration test, the foams produced in accordance with the present invention (foams 1 and 3) have a better UV resistance. This implies that advantageously, any discoloration due to light, especially UV light, of the polyurethane foam produced in accordance with the present invention (using only a phenolic antioxidant) is significantly deferred in time as compared to the foam wherein a combination of a phenolic antioxidant and an aminic antioxidant was used. This can be seen by comparing foam 1; (invention) with foam 2 (comparison) and by comparing foam 3 (invention) with foam 4 (comparison).

Still further, the above-described "VDA-278" test has been applied to foams 3 and 4. The results are shown in Table 3 below from which it appears that for foam 3 (invention) there was no contribution by antioxidant ("AO") to VOC and FOG, whereas there was such contribution for foam 4 (comparison). The criteria for passing said "VDA-278" test are: VOC<100 ppmw and FOG<250 ppmw. Thus, foam 4 did not pass the test whereas foam 3 did. Advantageously, this makes it possible to use the polyether polyol composition in accordance with the present invention in low VOC/FOG foam applications.

TABLE 3

|  | AO contribution to VOC (ppmw) | AO contribution to FOG (ppmw) |
|---|---|---|
| Foam 3 | 0 | 0 |
| Foam 4 | 28 | 555 |

That which is claimed is:

1. A process for preparing a polyurethane foam comprising reacting a polyol component comprising a polyether polyol and a polyisocyanate in the presence of a blowing agent and one or more antioxidants, wherein:
the polyether polyol has (i) only propylene oxide moieties as alkylene oxide moieties or (ii) only propylene oxide moieties and ethylene oxide moieties as alkylene oxide moieties, the ethylene oxide moieties being present in an amount in the range of 1 to 25 wt. % based on the weight the polyether polyol;
the polyether polyol has a molecular weight in the range of 500 to 6000 Daltons;
the polyether polyol has a functionality of 2 to 5;
the polyether polyol has a primary hydroxyl content of from 1 to 50%;
the one or more antioxidants consist of one phenolic antioxidant or two or more phenolic antioxidants, wherein the one or two or more phenolic antioxidants contain no atoms other than carbon, hydrogen and oxygen, and the amount of the one or two or more phenolic antioxidants is of from 3,300 to 6,000 parts per million by weight (ppmw) based on the polyether polyol, and wherein only one or two or more phenolic antioxidants are used as the one or more antioxidants and substantially no non-phenolic antioxidant is present in the process;
the one phenolic antioxidant or at least one of the two or more phenolic antioxidants is a compound of the following Formula (II):

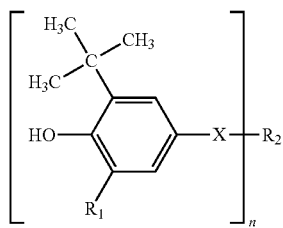

Formula (II)

wherein
$R_1$ is $C_4$ alkyl,
n is 1,
X is —$CH_2CH_2$—C(=O)—O— where —$CH_2CH_2$ is bonded to the benzene ring and C(=O)—O— is bonded to $R_2$, and
$R_2$ is $C_{16}$-$C_{20}$ alkyl, or
the polyisocyanate is an aromatic polyisocyanate selected from toluene diisocyanate (TDI), polymeric TDI, xylylene diisocyanate, tetramethylxylylene diisocyanate, methylene diphenyl diisocyanate (MDI) or polymeric MDI or a modified product thereof;
the isocyanate index is from 110 to 150;
the blowing agent comprises water, and water is used in an amount of 4 to 8 parts per hundred parts by weight of the polyol component (pphp);
the maximum temperature during the preparation of the polyurethane foam is higher than 140° C. and not more than 190° C.; and
the density of the polyurethane foam is of from 6 to 20 kg/m³.

2. The process according to claim 1, wherein the amount of the one or two or more phenolic antioxidants is of from 3,500 to 5,500 ppmw based on the polyether polyol.

3. The process according to claim 1, wherein the one phenolic antioxidant or at least one of the two or more phenolic antioxidants is octadecyl-3-(3,5-di-tert-butyl-4-hydroxyphenyl) propionate.

4. The process according to claim 1, wherein the one phenolic antioxidant or at least one of the two or more phenolic antioxidants has a molecular weight which is higher than 250 g/mol and which is at most 1,500 g/mol.

5. The process according to claim 1, wherein the polyether polyol has a functionality in the range of from 2.5 to 4.

6. The process according to claim 1, wherein the maximum temperature during the preparation of the polyurethane foam is of from 150 to 190° C.

7. The process according to claim 1, wherein the density of the polyurethane foam is from 6 to 19 kg/m³.

8. The process according to claim 1, wherein the blowing agent consists of water.

9. A process for preparing a polyurethane foam comprising reacting a polyol component comprising a polyether polyol and a polyisocyanate in the presence of a blowing agent and one or more antioxidants, wherein:
no polymer polyol is used in the process;
the polyether polyol has (i) only propylene oxide moieties as alkylene oxide moieties or (ii) only propylene oxide moieties and ethylene oxide moieties as alkylene oxide moieties, the ethylene oxide moieties being present in an amount in the range of 1 to 25 wt. % based on the weight the polyether polyol;
the polyether polyol has a molecular weight in the range of 500 to 6000 Daltons;
the polyether polyol has a functionality of 2 to 5;
the polyether polyol has a primary hydroxyl content of from 1 to 50%;
the one or more antioxidants consist of one phenolic antioxidant or two or more phenolic antioxidants, wherein the one or two or more phenolic antioxidants contain no atoms other than carbon, hydrogen and oxygen, and the amount of the one or two or more phenolic antioxidants is of from 3,300 to 6,000 parts per million by weight (ppmw) based on the polyether polyol, and wherein only one or two or more phenolic antioxidants are used as the one or more antioxidants and substantially no non-phenolic antioxidant is present in the process;
the one phenolic antioxidant or at least one of the two or more phenolic antioxidants is a compound of the following Formula (II):

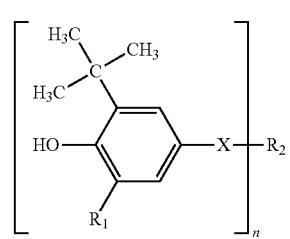

Formula (II)

wherein

R₁ is $C_4$ alkyl, n is 1,

X is —CH₂CH₂—C(=O)—O— where —CH₂CH₂ is bonded to the benzene ring and C(=O)—O— is bonded to R₂, and R₂ is $C_{16}$-$C_{20}$, or the polyisocyanate is an aromatic polyisocyanate selected from toluene diisocyanate (TDI), polymeric TDI, xylylene diisocyanate, tetramethylxylylene diisocyanate, methylene diphenyl diisocyanate (MDI) or polymeric MDI or a modified product thereof;

the isocyanate index is from 110 to 150;

the blowing agent comprises water, and water is used in an amount of 4 to 8 parts per hundred parts by weight of the polyol component (pphp);

the maximum temperature during the preparation of the polyurethane foam is higher than 140° C. and not more than 190° C.; and the density of the polyurethane foam is at least 6 kg/m³ and at most 23 kg/m³.

10. The process according to claim 9, wherein the density of the polyurethane foam is at least 6 kg/m³ and at most 20 kg/m³.

11. The process according to claim 9, wherein the density of the polyurethane foam is at least 6 kg/m³ and at most 19 kg/m³.

12. The process according to claim 9, wherein the blowing agent consists of water.

* * * * *